United States Patent
Vanderslice et al.

(10) Patent No.: US 7,913,673 B2
(45) Date of Patent: Mar. 29, 2011

(54) METHOD AND APPARATUS FOR CONTROLLING LIQUID FUEL DELIVERY DURING TRANSITION BETWEEN MODES IN A MULTIMODE ENGINE

(75) Inventors: Marc Vanderslice, Poway, CA (US); Greg Wiedemeier, San Diego, CA (US)

(73) Assignee: Clean Air Power, Inc., Poway, CA (US)

( * ) Notice: Subject to any disclaimer, the term of this patent is extended or adjusted under 35 U.S.C. 154(b) by 0 days.

(21) Appl. No.: 12/494,889

(22) Filed: Jun. 30, 2009

(65) Prior Publication Data

US 2010/0332106 A1    Dec. 30, 2010

(51) Int. Cl.
  *F02M 21/00*    (2006.01)

(52) U.S. Cl. .............. 123/525; 123/27 GE; 123/431; 123/575

(58) Field of Classification Search ............ 123/436, 123/27 GE, 525, 526, 575, 577, 431, 492; 701/103–105, 110
See application file for complete search history.

(56) References Cited

U.S. PATENT DOCUMENTS

| | | | | |
|---|---|---|---|---|
| 4,603,674 A * | 8/1986 | Tanaka | ............ | 123/575 |
| 6,055,963 A | 5/2000 | Brown et al. | | |
| 6,101,986 A | 8/2000 | Brown et al. | | |
| 6,543,395 B2 * | 4/2003 | Green | ............ | 123/27 GE |
| 6,561,157 B2 | 5/2003 | zur Loye et al. | | |
| 6,659,071 B2 | 12/2003 | LaPointe et al. | | |
| 6,684,849 B2 * | 2/2004 | zur Loye et al. | ............ | 123/295 |
| 6,907,870 B2 * | 6/2005 | zur Loye et al. | ............ | 123/594 |
| 7,051,693 B2 | 5/2006 | Tetsuno et al. | | |
| 7,079,941 B2 | 7/2006 | Tetsuno et al. | | |
| 7,093,588 B2 * | 8/2006 | Edwards | ............ | 123/525 |
| 7,206,688 B2 | 4/2007 | Wang et al. | | |
| 7,222,015 B2 | 5/2007 | Davis et al. | | |
| 7,270,089 B2 | 9/2007 | Wong | | |
| 7,284,506 B1 | 10/2007 | Sun et al. | | |
| 2005/0121005 A1 | 6/2005 | Edwards | | |
| 2007/0062467 A1 | 3/2007 | Tanaka et al. | | |
| 2007/0078040 A1 | 4/2007 | Nobumoto et al. | | |

FOREIGN PATENT DOCUMENTS

EP    1 600 629 A2    5/2005
EP    1 403 512 B1    6/2006

* cited by examiner

*Primary Examiner* — Hai H Huynh
(74) *Attorney, Agent, or Firm* — Boyle Fredrickson, S.C.

(57) ABSTRACT

A method of transitioning between operating modes in a multimode engine including a diesel-only mode and a diesel pilot, gas mode includes first terminating or initiating the supply of a gaseous fuel, depending on whether the system is transitioning to or from the pilot mode, and thereafter decreasing or increasing the diesel fuel supply quantity. Liquid fuel supply quantity is preferably altered in steps rather than discretely in order to avoid exceeding the lean limit of gas lambda. The number of steps and the percentage decrease or increase in each step preferably varies based at least in part on prevailing speed and load conditions.

21 Claims, 6 Drawing Sheets

METHOD AND APPARATUS FOR CONTROLLING LIQUID FUEL DELIVERY DURING TRANSITION BETWEEN MODES IN A MULTIMODE ENGINE

BACKGROUND OF THE INVENTION

1. Field of the Invention

This invention relates generally to multimode engines capable of operating in multiple fueling modes, and, more particularly, relates to a method and apparatus for transitioning between fueling modes in such an engine so as to reduce engine speed fluctuation and/or other undesired responses to such transitions.

2. Discussion of the Related Art

So-called "multimode" engines are capable of operating in multiple fueling modes in that they are powered by different fuels or combinations of fuels depending, e.g., on the prevailing engine speed and load conditions. For example, a dual fuel engine can typically operate in two modes, namely, a "diesel-only mode" and a "pilot ignited gaseous fuel mode" or simply "pilot mode." In the diesel-only mode, the engine is fueled solely by a liquid fuel, typically diesel fuel. In the pilot mode, the engine is fueled primarily by a gaseous fuel, such as natural gas or propane, which is ignited by a relatively small quantity or "pilot" charge of a liquid fuel, typically diesel fuel or engine lube oil.

Depending upon the particular engine utilized, there are typically at least two transition points within the operating range of a dual fuel engine. Specifically, the typical engine is operated in pilot mode except at the condition that the excess air ratio (lambda) of gas does not permit, such as, (1) very light load under all engine speeds and, (2) at high load, low speed conditions. The transition historically was triggered and controlled based solely as a function of speed and/or load without attempting to achieve a smooth transition. This relatively uncontrolled transition could lead to undesired speed fluctuations. For example, in a prior art dual fuel system, as the vehicle is driving up a hill while operating in pilot ignited gaseous fuel mode, the vehicle's engine speed may lug down sufficiently to trigger a changeover to diesel mode. An uncontrolled rapid switchover to diesel may cause a power surge and a resultant increase in vehicle speed back above the pilot mode transition speed for the prevailing load, whereupon the engine switches back to pilot mode and experiences a power drop. As a result, the vehicle speed may again drop below the transition speed with a resultant switchover to diesel-only mode. Hence, the engine may switch frequently and repeatedly between operating modes, resulting in noticeable speed surges and droops.

Some prior systems have recognized the problem identified above and have attempted to address it by taking the total energy content of the fuel(s) into account during the transition in an attempt avoid power surges and droops. For instance, U.S. Pat. No. 6,101,986 to Brown (the Brown patent) controls the delivery of diesel and gaseous fuel to the engine during transition between the pilot mode and the diesel-only mode to maintain the energy content of combined fuel charge at the desired value of the diesel fuel charge supplied at the end of the transition period. As a result, the quantity of diesel fuel progressively increases during the transition period, while the quantity of gaseous fuel progressively decreases. The process is repeated in a cycle-by-cycle basis until the actual diesel fuel quantity equals the desired quantity for diesel only operation, at which point the transition is considered complete.

A problem associated with prior techniques for controlling the transition between operating modes in a multimode engine is that simply maintaining the total fuel energy content constant during the transition period fails to take differences in combustion efficiency into account while air charge parameters remain unchanged. That is, (1) diesel fuel has a lower heating value and a lower stoichiometric air fuel ratio than gaseous fuel per unit fuel mass and, (2) combustion efficiency of pilot ignited gaseous fuel depends on excess air ratio of gas (gas lambda) and ignition timing. Simply increasing or decreasing gaseous fuel quantity may not achieve the desired effect because gas lambda may be outside of an optimal range for the selected gaseous fuel quantity. Existing airflow control devices are incapable of adjusting airflow to the cylinders rapidly enough to immediately obtain the optimum lambda for the selected quantity of the new fuel. As a result, the engine may still exhibit power surges and droops, even if total fuel energy content remains constant.

More recently, U.S. Pat. No. 7,270,089 to Wong proposed a more sophisticated technique in which at least one engine operating parameter other than total fuel energy content is taken into account in order to maintain a smooth transition between modes of a multimode engine. The parameter preferably comprises at least one of primary fuel excess air ratio (lambda) and ignition timing, and preferably is controlled in addition to total fuel energy content control. Lambda control is especially beneficial because it permits the control system to compensate for the engine's inability to substantially alter the instantaneous air mass in the combustion chamber during the transition period. For instance, during a transition from pilot mode to diesel-only mode, the controlled parameter typically comprises diesel lambda, and the controlling operation comprises setting a target or desired diesel lambda at a relatively high value at the beginning of the transition period and thereafter reducing diesel lambda during the transition period. In this case, the controlling operation may comprise determining a gas lambda of the gaseous fuel, determining a diesel lambda limit, and adjusting diesel fuel delivery to be at or above the diesel lambda limit. The diesel lambda limit preferably is initially determined based on the prevailing gas lambda and then adjusted downwardly on a cycle-by-cycle basis to a final value that is at or near the diesel smoke limit. The magnitude of adjustment in each cycle is preferably speed and/or time dependent.

The technique disclosed in the Wong patent works very well. However, it is not easily-implemented on a single point injection system in which the gas is introduced into the air supply system upstream of the air intake manifold via a mixer. In these systems, there can be a significant lag between the time that the gaseous fuel supply is initiated or terminated and the time that the gas reaches the first cylinders in the supply stream. Controlling fuel flow based only on total energy content, lambda, or other engine operating conditions without taking this delay into account can result in an unintended oversupply or undersupply of gaseous fuel. Depending on the available prevailing air flow ratio and resultant gas lambda, an unintended undersupply can lead to the lean limit of the engine's gaseous fuel supply being exceeded with the potential for misfire. An unintended oversupply can lead to temporary power surge.

The need therefore exists to provide a multimode engine that assuredly provides a smooth transition between operating modes using a simple, easy to implant strategy.

The need also exists to provide a method of providing a smooth transition between operating modes of a multimode engine, even if the engine is provided with single point gas injection.

SUMMARY OF THE INVENTION

In accordance with a preferred aspect of the invention, a method of transitioning between operating modes in a multimode engine including a diesel-only mode and a pilot mode includes first terminating or initiating the supply of a gaseous fuel, depending on whether the system is transitioning to or from the pilot mode, and thereafter decreasing or increasing the liquid fuel supply quantity.

Liquid fuel supply quantity is preferably altered in multiple steps rather than all at once in order to avoid exceeding the lean limit of gas lambda or power surges. The number of steps and the percentage decrease or increase in each step preferably varies based at least in part on prevailing speed and load conditions.

In accordance with another aspect the invention, a system is provided that transitions between fueling modes in a multimode engine using a technique that proceeds it least generally as described above.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

The mode switching concepts and transition controls described herein are applicable to a variety of multimode engines in which it is desirable to maintain engine torque and/or speed substantially constant when transitioning between operating modes. Hence, while a preferred embodiment of the invention will now be described in conjunction with a turbocharged, low pressure EGR, single point gas fuel supply dual fuel engine, it is usable with tri-mode and other multimode engines as well. For instance, it could be fueled on a multi-fuel engine operating in a first mode in which the engine is fueled exclusively by a liquid first such as diesel fuel and a second mode in which natural gas is ignited by a second liquid such as lube oil.

Figure 1:
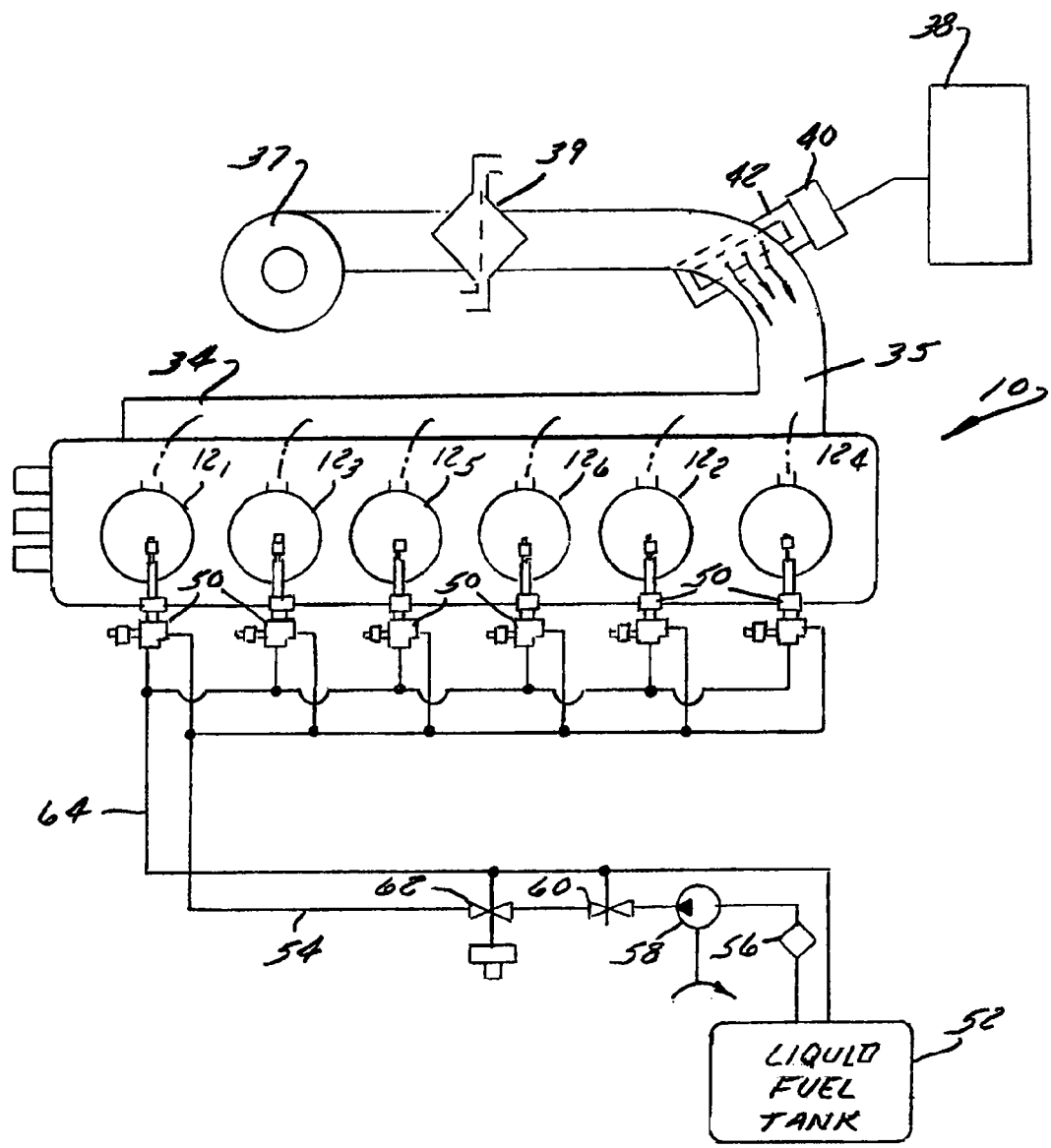
FIG. 1 schematically represents a dual fuel engine constructed and controlled in accordance with a preferred embodiment of the present invention.
Figure 2:
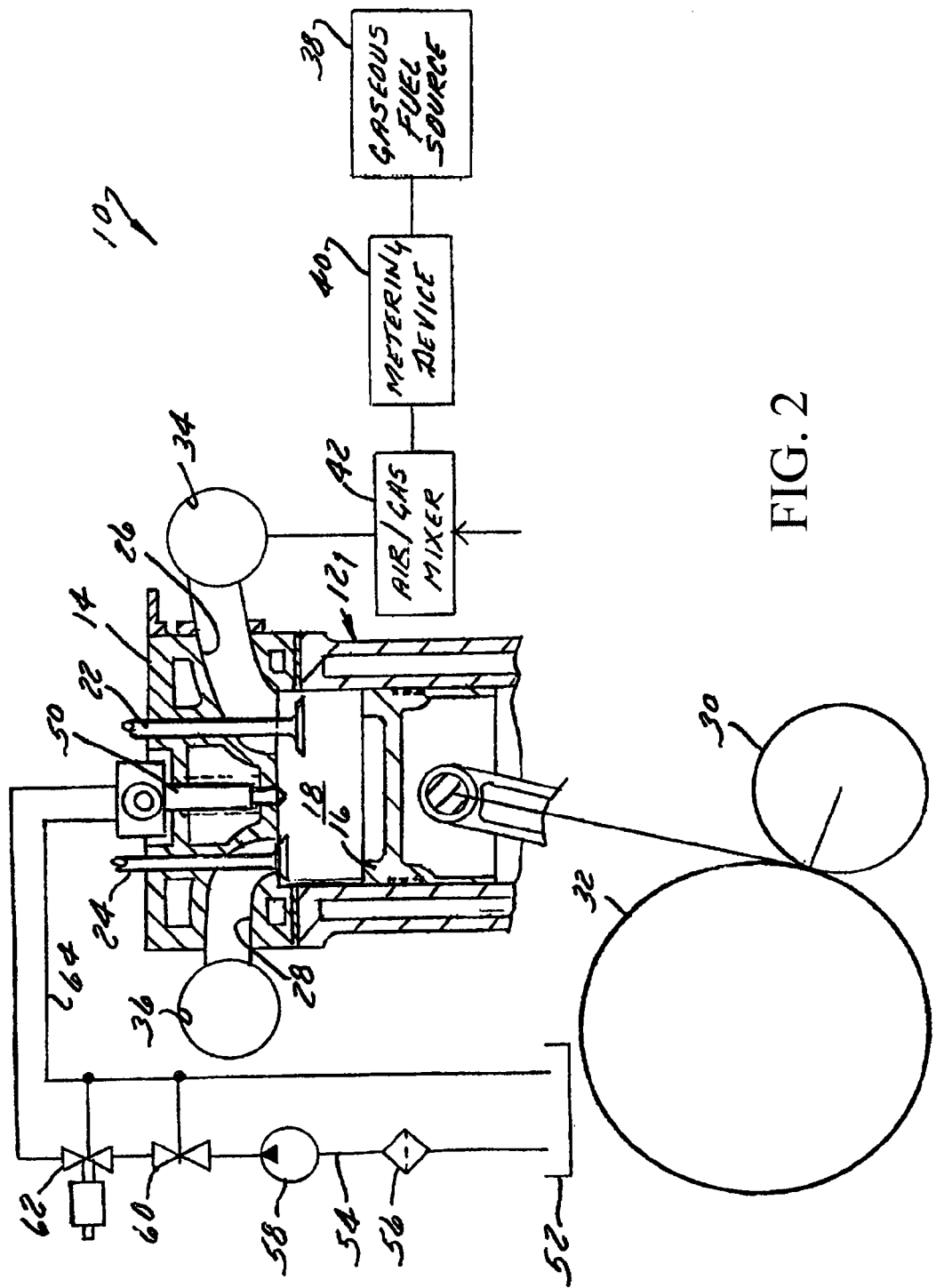
FIG. 2 is a partially schematic sectional side elevation view of a cylinder of the engine of FIG. 1 and of associated engine components.

The exemplary engine 10 illustrated in FIGS. 1-2 is a compression ignition-type internal combustion engine having a plurality of cylinders 12, each capped with a cylinder head 14 (FIG. 2). Six cylinders $12_1$-$12_6$ are shown in this embodiment. As is also shown in FIG. 2, a piston 16 is slidably disposed in the bore of each cylinder to define a combustion chamber 18 between the cylinder head 14 and the piston 16. Piston 16 is also connected to a crankshaft 20 in a conventional manner. Inlet and exhaust valves 22 and 24 are provided at the end of respective passages 26 and 28 in the cylinder head 14 and are actuated by a standard camshaft 30 that is rotated by a crankshaft 32 so as to control the supply of an air/fuel mixture to and the exhaust of combustion products from the combustion chamber 18. Gases are supplied to and exhausted from engine 10 via an air intake manifold 34 and an exhaust manifold 36, respectively. An intake air control system is also provided that includes a turbocharger 37 and a turbo air bypass (TAB) valve 39 that can be controlled to effectively vary the output of the turbocharger 37.

The engine 10 is also fitted with a gaseous fuel supply system, either in an OEM or a retrofit (conversion) process. The system includes a source of gaseous fuel 38 such as a compressed natural gas (CNG) fuel tank. Other sources, such as liquefied natural gas (LNG) could also be used. The gaseous fuel may be supplied to the cylinders $12_1$-$12_6$ from the source 38 via any suitable mechanism. For instance, a separate electronically actuated external injector could be provided for each cylinder or, in the case of a shared port intake system, for each pair of injectors or from a single point source for the entire engine. Injectors of this type are disclosed, for example, in U.S. Pat. No. 5,673,673 and entitled Method and Apparatus for the High Mach Injection of a Gaseous Fuel into an Internal Combustion Engine, the subject matter of which is incorporated herein by reference. In the preferred embodiment, however, the gaseous fuel is supplied to the intake manifold 34 via a fuel metering device 40 and an air/gas mixer 42. The fuel metering device 40 may be any suitable electronically controlled actuator capable of supplying gaseous fuel at times and quantities demanded by a gaseous fuel controller 70 (detailed below). One suitable fuel metering device is a gas injector available from the Clean Air Power gas injector, Part No, 619625. The air/gas mixer 42 may be any conventional mixer, such as the one disclosed in U.S. Pat. No. 5,408,978 and entitled Gaseous Fuel Entrainment Device and Method, the subject matter of which is incorporated by reference. Shut off valve(s) and other equipment for controlling the flow of gas to the metering device 40, all of which are known to those skilled in the art, are omitted for the sake of convenience.

Liquid fuel could be supplied to the cylinders $12_1$-$12_6$ via either a pump/nozzle supply system or via a common rail supply system as described, for example, in U.S. Pat. No. 5,887,566, and entitled Gas Engine with Electronically Controlled Ignition Oil Injection, the subject matter of which is incorporated herein by reference. The illustrated engine 10 employs pump/nozzle supply system having multiple electronically controlled liquid fuel injectors 50. Each injector could comprise any electronically controlled injector. Referring to FIGS. 1 and 2, each injector 50 is fed with diesel fuel or the like from a conventional tank 52 via a supply line 54. Disposed in line 54 are a filter 56, a pump 58, a high-pressure relief valve 60, and a pressure regulator 62. A return line 64 also leads from the injectors 50 to the tank 52.

Figure 3:
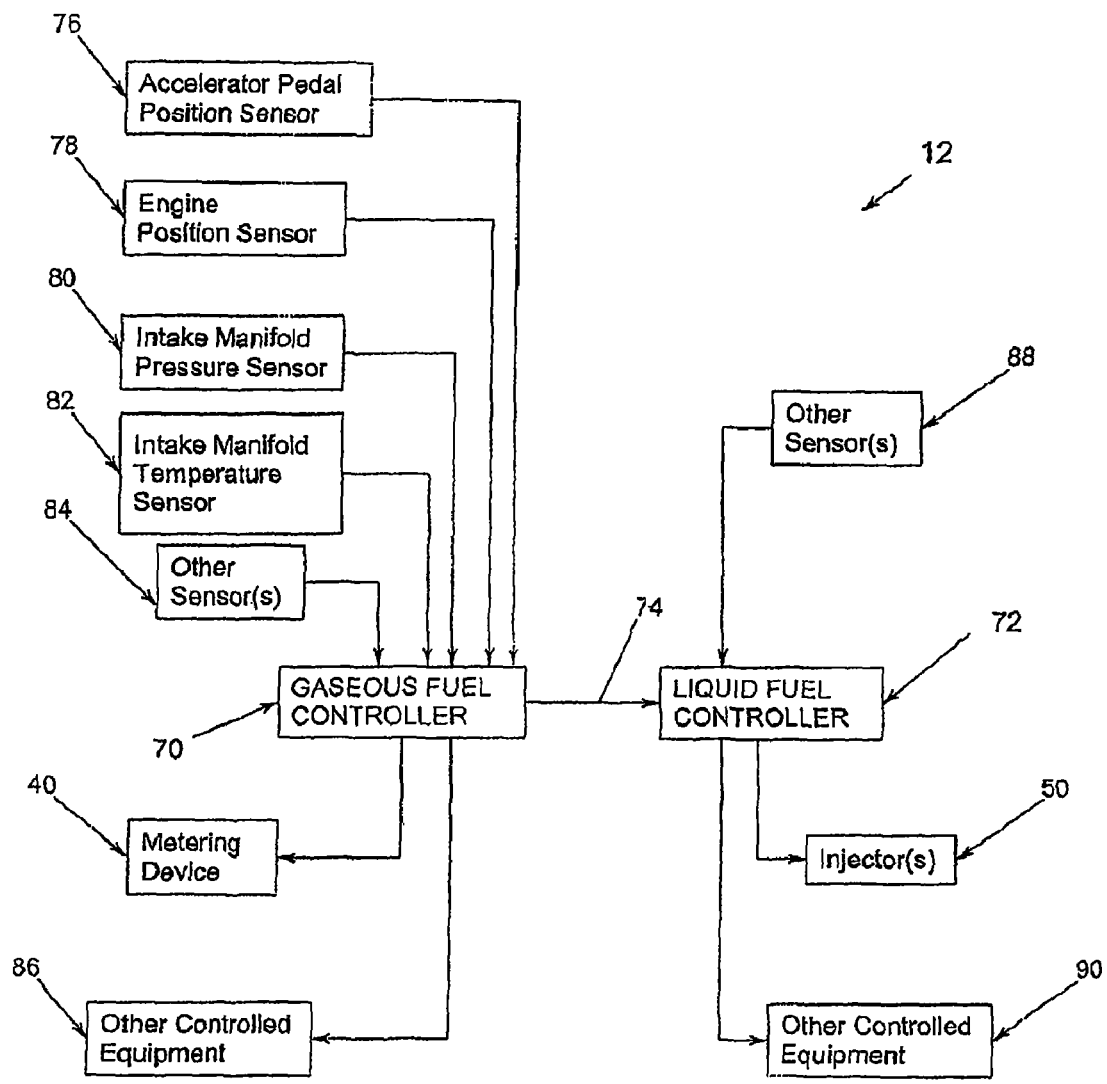
FIG. 3 is a schematic control diagram of the engine of FIGS. 1 and 2 and of its attendant controllers and sensors.

The engine control system 1 may be governed either mechanically or electronically. The illustrated engine control system 1 is electronically governed. As shown in FIG. 3, engine operation is monitored by an accelerator pedal position sensor 76, an engine position sensor 78, an intake manifold pressure sensor 80, and an intake manifold temperature sensor 82. Other sensors, such as a coolant, temperature sensor, an ambient pressure sensor, an ambient temperature sensor, and a vehicle speed sensor may be provided as well. These sensors are collectively denoted 84 and are connected to the gaseous fuel controller 70 by appropriate signal line(s). Still other sensors that are needed only when the engine 10 is operating in diesel-only mode are denoted as 88 and connected to the liquid fuel controller 72. They could alternatively be connected to the gaseous fuel controller 70, in which case the information contained therein would simply be relayed in an unmodified fashion to the liquid fuel controller 72 via the data link 74. The gaseous fuel controller 70 also is connected to the gas metering device 40, and to other controlled equipment, such as high-pressure and/or low pressure gas shut off valves, denoted by reference numeral 86. The liquid fuel controller 72 is connected to each of the injectors 50. It could also control other components of the engine, as denoted by reference numeral 90.

The gaseous fuel controller 70 is operable to control the liquid fuel controller 72 in a master-slave relationship so as to cause the liquid fuel controller 72 to control the fuel injectors 50 to inject pilot fuel into the cylinders $12_1$-$12_6$ at a timing and quantity that achieve the desired effect at prevailing speed and load conditions. This control need not be with feedback from the liquid fuel controller 72 to the gaseous fuel controller 70. It instead may be performed by intercepting signals that, in an OEM engine, would have been bound for the liquid fuel controller 72 and modifying those signals to effect pilot fuel injection for multi-fuel operation rather than diesel-only injection for diesel-only operation. Routines for pilot fuel timing control and pilot fuel quantity control are described in International Patent Application Ser. No PCT/EP2006/061566, Gas-Fueled Compression Ignition Engine Having OEM-Type Liquid Fuel Controller, the subject matter of which is incorporated herein in its entirety.

Figure 4:
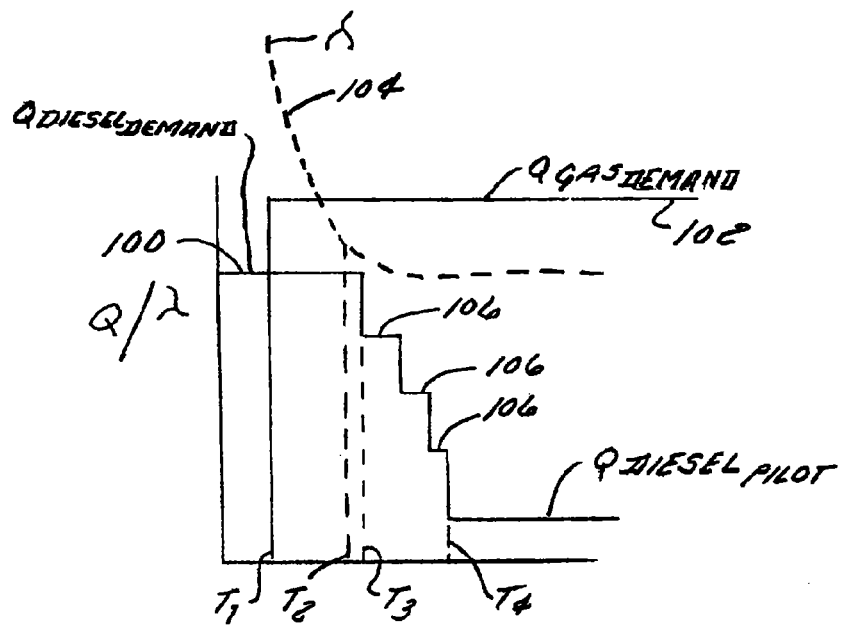
FIG. 4 is a graph illustrating transition of fueling from diesel-only mode to pilot mode.

Turning now to FIG. 4, a process for transitioning from the diesel-only fueling mode to a diesel-pilot ignited, natural gas fueling mode (hereafter simply "pilot mode") is graphically illustrated. The process is preferably carried out with gas supply being controlled by the gaseous fuel controller 70 and diesel supply being controlled by the liquid fuel controller 72 with the input of or under the control of the gaseous fuel controller 70.

In this graph, curves 100, 102 represent the quantity of diesel fuel and natural gas being supplied to the engine as a function of time. Diesel fuel is initially supplied at a quantity $QDIESEL_{DEM}$ required for the prevailing speed and load conditions, and the transition to pilot mode occurs at time T1 when the gaseous fuel supply quantity is increased immediately from zero to the final quantity $QGAS_{DEM}$ required for prevailing speed and load conditions. In order to maximize substitution of gaseous fuel for diesel fuel, T1 preferably is selected to be a time at which the gas lambda for the demanded fuel quantity, represented by curve 104, for the available airflow rate is outside of optimum but well below the lean lambda limit. For instance, if optimum gas lambda is 1.5-1.9, T1 may be selected to occur when lambda drops below 1.95. This is still well below the lean lambda limit of about 2.10.

While the gas supply upstream of the inlet of air intake manifold 34 increases essentially immediately to $QGAS_{DEM}$, gas lambda in the cylinders $12_1$-$12_6$ does not decrease immediately due to the fact that it takes some time for the introduced gas to reach the cylinders. Hence, as can be seen by curve 104, the lean limit of gas lambda is exceeded in all of the cylinders $12_1$-$12_6$ until a subsequent time T2 when the gas reaches the first cylinder whose intake port opens to gas/air mixture. The time T2 may depend on the instantaneous speed and load conditions. The delay period may also be dependent on the physical geometry of the engine. If, as in the illustrated embodiment, the closest cylinder $12_4$ is relatively close to the inlet 35 of the intake manifold 34, T2 will be delayed more for a given set of speed and load conditions than if the closest cylinder $12_4$ were relatively far from the intake manifold inlet, as might be the case in a V-8 engine or any other engine in which the intake manifold inlet is between two cylinders. In addition, the delay period will depend on the location in the engine's firing sequence that gas switchover occurs. For instance, assuming the engine 10 is firing in the sequence of the numbers designated in FIG. 1, the delay period T2-T1 will end when the gas reaches the first cylinder that fires after the gaseous charge reaches that cylinder. That cylinder may or may not be the closest physical cylinder to the intake manifold inlet 35. The delay period T2-T1 can be determined empirically for a full set of engine operating conditions, including a full set of speed and load conditions, and stored in the controller 70 as a map or look-up table.

Pursuant to the preferred embodiment of the invention, the quantity of diesel fuel supplied is retained at $QDIESEL_{DEM}$ until a time T3 just after time T2. As a practical matter, T3 need not be determined separately from T2, but, instead, can simply be mapped instead of T2 with the goal of delaying diesel fuel decrease until a safe period of time until after the gas-air mixture reaches the first cylinder to be fueled by that mixture.

At time T3, the commanded the diesel fuel quantity starts to decrease from $QDIESEL_{DEM}$ to a pilot quantity $QDIESEL_{PILOT}$ in a calibratable number of steps. $QDIESEL_{PILOT}$ typically varies from about 10% to 30% on a total energy content basis, with it forming a higher percentage of the total fuel charge on a total energy content basis at low speed, low load conditions than at high speeds or high loads. However, because more total energy is required at high speeds or high loads, the diesel savings is higher at high speeds or high loads than at low speed, low load operation. Stated another way, the decrease in substitution percentage at low speed, low load conditions is less troublesome than may appear at first glance because less total fuel is being consumed.

In this embodiment, the quantity of supplied diesel fuel is reduced incrementally or stepwise rather than all at once in order to avoid a noticeable reduction in instantaneous power as the gas mixtures continue to propagate through the air inlet manifold. As such, the quantity of diesel is not reduced to $QDIESEL_{pilot}$ until a time T4 that may lag behind time T3 substantially. The number of steps 106 and the percentage decrease of each step is preferably set to maintain the total energy supply generally constant until the final cylinder in the firing sequence receives the full gas charge. These parameters initially can be estimated based on the calculated gas lambda required for each firing cylinder based on prevailing speed and load conditions, and then tested and adjusted empirically simply by altering the number and duration of steps during testing to avoid any significant power surges or drops. The thus-determined values can then be mapped over a full range of speed and load conditions and stored in controller 70 in a map or look-up table. The timing and amount of QDIESEL reduction may be tuned separately for each cylinder.

Figure 5:
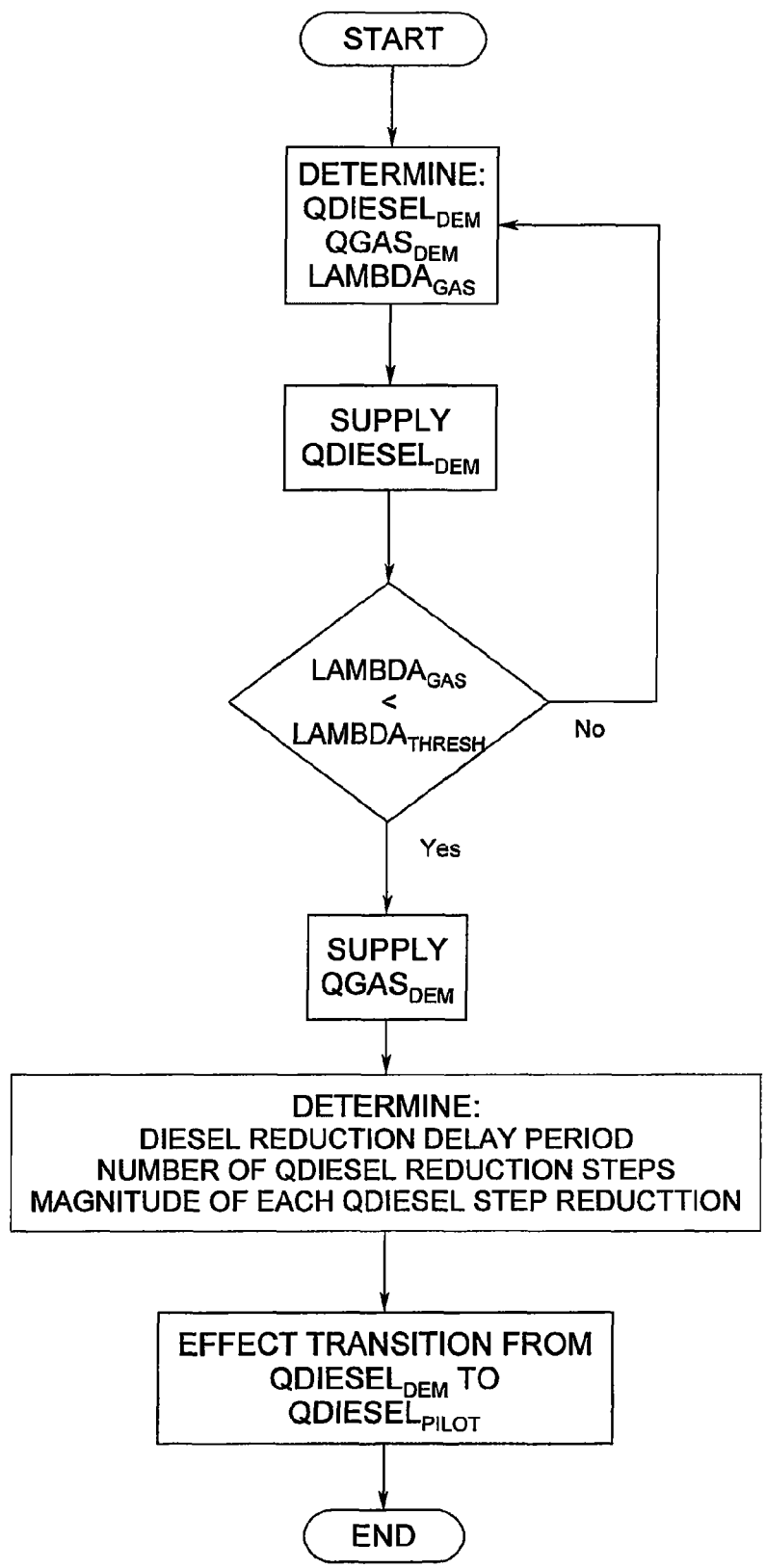
FIG. 5 is a flowchart illustrating a preferred computer-implemented technique for effecting the transition of FIG. 4.

Turning now to FIG. 5, a flowchart of a routine 150 they can be implemented by the controller 70 to perform the functions described above in connection with FIG. 4 is illustrated. The routine 150 is implemented on a cycle-by-cycle, full/speed, full/load basis while the engine 10 is operating in diesel-only mode, which will typically be the case under all low speed operating conditions and under high-speed, high-load conditions. The routine 150 proceeds from START in block 152 to block 154, where the diesel fuel quantity $QDIESEL_{DEM}$ required for prevailing load and speed conditions is determined. The quantity of gas $QGAS_{DEM}$ that would be required to provide the same total energy content of the demanded diesel quantity is also determined at this time. The corresponding gas lambda, $LAMBDA_{GAS}$, is also determined. Then, in block 156, the routine 150 determines whether the determined $LAMBDA_{GAS}$ is less than a threshold $LAMBDA_{THRESH}$ that is an acceptable amount below the lean limit of gas lambda, for example, 1.95. If not, the routine 150 proceeds to block 158, where the controller 70 causes the controller 72 to transmit the appropriate signals to the appropriate injector 50 to supply $QDIESEL_{DEM}$ to the cylinder, and the routine 150 returns to block 154.

If, however, the answer to the inquiry of block 156 is yes, indicating that determined $LAMBDA_{GAS}$ is in fact less than the $LAMBDA_{THRESH}$, the routine 150 then proceeds to block 158, where the quantity of gas supplied by the injector 142 is increased immediately from zero to $QGAS_{DEM}$. This occurs at time T1 in FIG. 4 in the given example. The routine 150 then proceeds to block 162, where the length of the diesel reduction delay period (T3-T1) is determined for prevailing engine operating conditions. At that time, the controller 150 also determines the desired final quantity of pilot diesel fuel $QDIESEL_{PILOT}$ at the end of the transition period, the length of the transition period (T4-T3), and the number of reduction steps and the magnitude of each step required to reduce the quantity of diesel fuel to $QDIESEL_{PILOT}$ by the time T4 in FIG. 4. The routine 150 then proceeds to block 164, where the diesel injectors 50 are controlled during the period T4-T3 to reduce the quantity of pilot fuel to $QDIESEL_{PILOT}$ in a stepwise fashion as discussed above in connection with FIG. 4. When the transition is complete at time T4 the routine 150 proceeds to block 166, where the pilot to diesel-only transition control routine 250 is implemented. That routine is discussed below in conjunction with FIG. 7.

Figure 6:
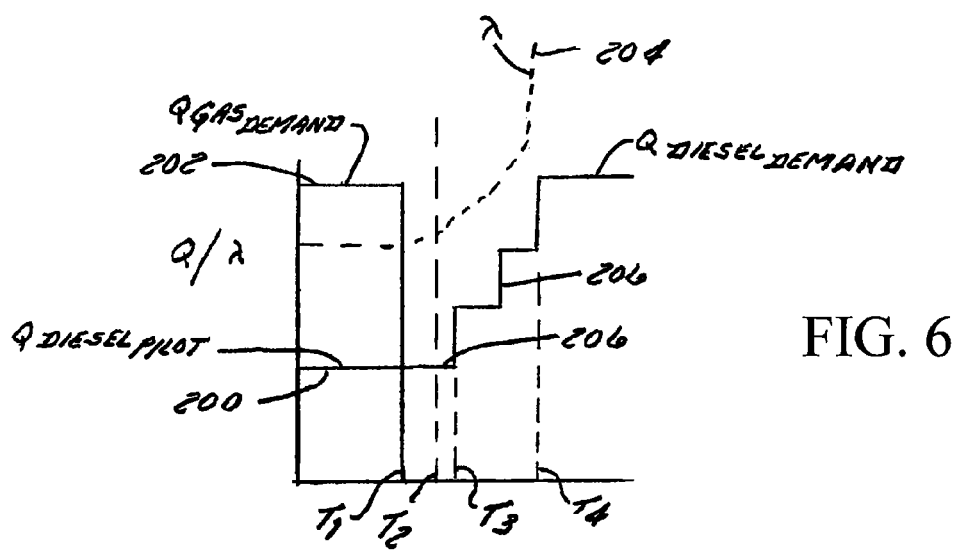
FIG. 6 is a graph illustrating transition of fueling from a pilot mode to a diesel-only mode.

Turning now to FIG. 6, a process for transitioning from pilot mode to diesel-only mode occurs in generally the reverse of the transition from diesel-only mode to pilot mode, and is based on essentially the same considerations discussed above in connection with FIG. 4. Specifically, engine operation is monitored on a cycle-by-cycle basis to determine whether the actual gas lambda, represented by curve 204, is approaching the lean lambda limit. When this occurs at time T1 in FIG. 6, the gas supply to the mixer 42, represented by curve 202, is shut off to reduce the quantity of supplied gas immediately from $QGAS_{DEM}$ to 0. The supplied quantity of diesel fuel, represented by curve 200, is subsequently increased from $QDIESEL_{PILOT}$ to an increased quantity $QDIESEL_{DEM}$ that provides the demanded total energy for prevailing speed and load conditions. However, as with the transition from pilot operation to diesel-only operation, the change in the quantity of supplied diesel fuel is delayed and then changes in increments or stepwise rather than all at once. The delay and initial increase, followed by the stepwise increase, are effected in recognition of the fact that some gas remains present in the supply system, particularly within the intake manifold 34, for a time after the gas supply to the mixer 40 is shut off, and it is desirable to delay and then phase-in the diesel fuel increase in order to avoid power surges. More preferably, in order to prevent or at least reduce power surges, the increase in diesel fuel supply quantity is delayed to a time T3 that occurs after the lean limit of gas lambda is reached at time T2. As with the pilot to diesel-only transition discussed above in connection with FIG. 4, the length of the delay period T3-T1, the number of steps in the consequent transition period T4-T3, and the magnitude of each step are determined empirically on a full-speed, full-load basis with the goal of maintaining generally constant power and stored in a map or lookup table in the controller 70.

Figure 7:
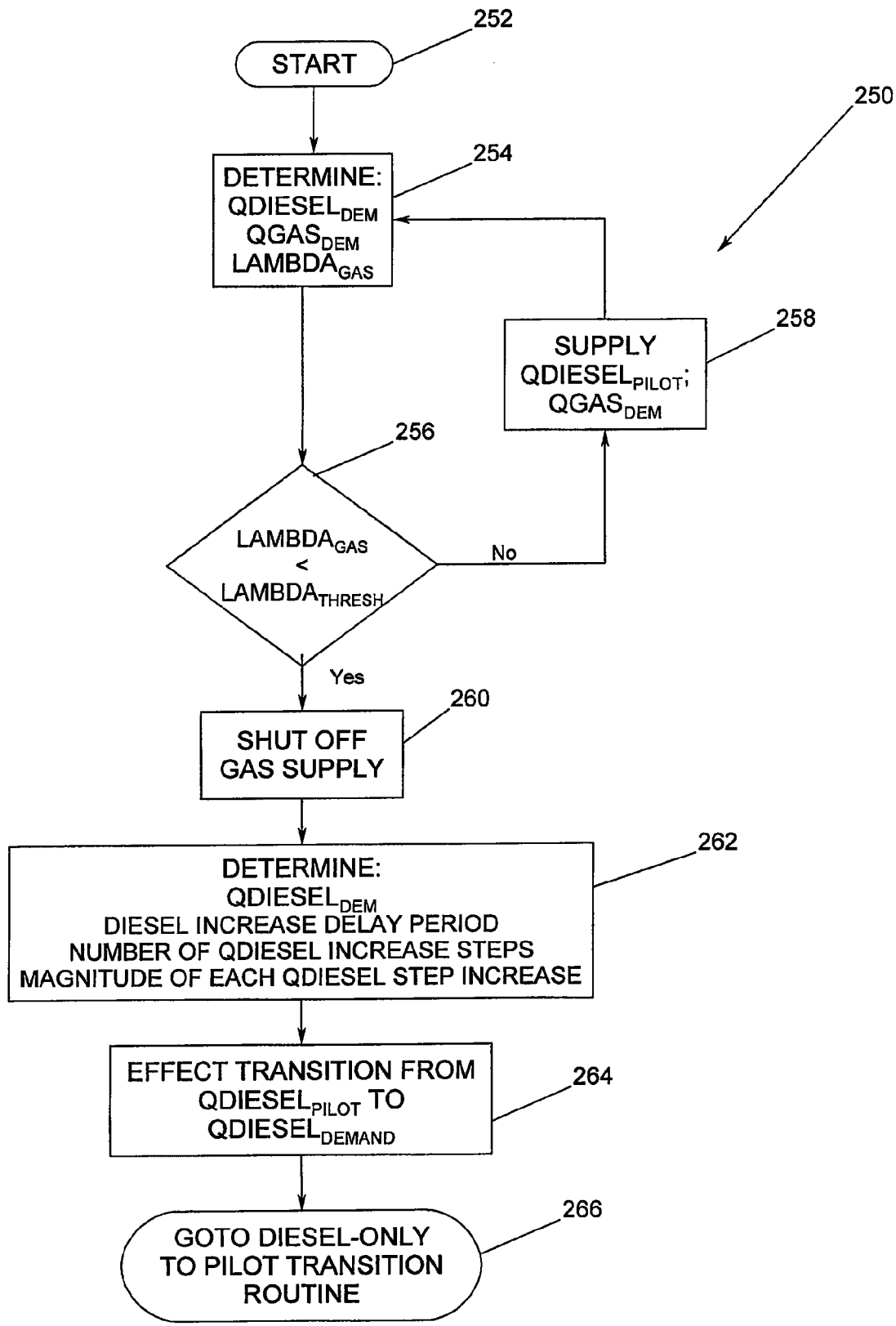
FIG. 7 is a flowchart illustrating a preferred computer-implemented technique for effecting the transition of FIG. 4.

Turning now to FIG. 7, a flowchart of a routine 250 that can be implemented by the controller 70 to perform the functions described above in connection with FIG. 4 is illustrated. Like the routine 150 discussed above, the routine 250 is implemented on a cycle-by-cycle, full-speed, full-load basis while the engine 10 is operating in pilot mode, which will typically be the case under all ranges except low speed operating conditions and under high-speed, high-load conditions. The routine 250 proceeds from START in block 252 to block 254, where the gas and diesel fuel quantities $QGAS_{DEM}$ and $QDIESEL_{DEM}$ required for prevailing load and speed conditions, as well as the resulting gas lambda $LAMBDA_{GAS}$, are determined. Then, in block 258, the routine 250 determines whether the determined $LAMBDA_{GAS}$ is at or below a threshold $LAMBDA_{THRESH}$ that is an acceptable amount below the lean limit of gas lambda, for example, 1.95. If so, the routine 250 proceeds to block 258, where the controller 70 transmits the appropriate signal to the gas injector 40 to supply the demanded quantities of gas $QGAS_{DEM}$ and also causes the controller 72 to transmit the appropriate signal to the diesel injector 50 to supply fuel $QDIESEL_{PILOT}$. The routine 250 then returns to block 254.

If, however, the answer to the inquiry of block 256 is yes, indicating that determined $LAMBDA_{GAS}$ is in fact approaching then the lean lambda limit, the routine 250 proceeds to block 260, where the quantity $QGAS_{DEM}$ of gas supplied to the mixer 42 is decreased immediately from the demanded quantity to 0 at time T1 in FIG. 6. The routine 250 then proceeds to block 262, where the length of the diesel increase delay period (T3-T1) is determined for prevailing engine operating conditions. At that time, the routine 250 also determines the desired final quantity of diesel fuel $QDIESEL_{DEM}$ to be delivered, the duration (T4-T3) of the transition period, and as the number of steps 206 and the magnitude of each step increase that are required to increase the quantity of diesel fuel to the $QDIESEL_{DEM}$ by the time T4 in FIG. 4. The routine 250 then proceeds to block 264, where the diesel injectors 50 are controlled during the period T4-T3 to increase the supply of pilot fuel to $QDIESEL_{DEM}$ in a stepwise fashion as discussed above in connection with FIG. 6. When the transition is complete at time T4, the routine 250 proceeds to block 266, where the diesel-only to pilot transition control routine 150 is again implemented.

To the extent that they might not be apparent from the above, the scope of variations falling within the scope of the present invention will become apparent from the appended claims.

We claim:

1. A method of fueling a multimode internal combustion engine, the engine comprising:
   (A) selectively operating the engine in a first, diesel-only mode in which the engine is fueled at least primarily by a compression ignited liquid fuel supplied in a commanded quantity; then
   (B) selectively operating the internal combustion engine in a second, pilot mode in which the engine is fueled at least partially by a pilot ignited gaseous fuel that is supplied at a commanded quantity; and
   (C) during a transition period from between said first and second modes,
      i. increasing a gaseous fuel supply quantity from zero to a demanded quantity, then
      ii. decreasing a liquid fuel supply quantity from a commanded quantity to a pilot quantity.

2. The method of claim 1, wherein the decreasing step is initiated after a predetermined delay period following the end of the increasing step.

3. The method of claim 1, wherein the delay period is dependent on at least one of the speed and load conditions prevailing during the transition and engine geometry.

4. The method of claim 1, wherein the delay period is one which avoids a lean limit of gas lambda from being exceeded during the transition period.

5. The method of claim 1, wherein the increasing step is performed in a single step.

6. The method of claim 1, wherein the decreasing step occurs in a plurality of increments of predetermined magnitude.

7. The method of claim 6, wherein the number of increments is dependent on at least one of the prevailing speed and load conditions during the transition period, and engine geometry.

8. The method of claim 6, wherein the magnitude of each increment is dependent on at least one of the prevailing speed and load conditions during the transition period and engine geometry.

9. The method of claim 1, wherein the gaseous fuel quantity is commanded based on gas lambda.

10. The method of claim 1, further comprising, during a transition from pilot mode to diesel-only mode
   (A) decreasing the quantity of supplied gaseous fuel from a commanded value to at least substantially zero; then
   (B) increasing the quantity of the liquid fuel from a pilot quantity to the commanded quantity.

11. The method of claim 10, wherein the liquid fuel quantity increasing step is initiated after a predetermined delay period following the end of the gas quantity decreasing step.

12. The method of claim 11, wherein the delay period is one which at least substantially avoids power fluctuations during the transition period.

13. The method of claim 10, wherein the gaseous fuel quantity increasing step is performed in a single step.

14. The method of claim 10, wherein the liquid fuel quantity increasing step occurs in a plurality of increments of predetermined magnitude.

15. A method comprising:
   (A) selectively operating an internal combustion engine in a first, diesel-only mode in which the engine is fueled at least primarily by a liquid fuel supplied in a quantity commanded by an electronic controller commanded;
   (B) selectively operating the internal combustion engine in a second, pilot mode in which the engine is fueled at least partially by a pilot ignited gaseous fuel supplied at a commanded quantity; and
   (C) automatically transitioning from the first mode to the second mode, the transitioning process including
      i. increasing a gaseous fuel supply quantity from zero to a demanded quantity in single increment, then
      ii. after a determined delay period, decreasing a liquid fuel supply quantity from a commanded quantity to a predetermined pilot quantity, the decreasing step being performed in a plurality of increments of predetermined magnitude.

16. An internal combustion engine comprising:
   (A) at least one cylinder;
   (B) an air intake system opening into the cylinder;
   (C) a liquid fuel supply which supplies a liquid fuel to the cylinder;
   (D) a gaseous fuel supply which supplies a gaseous fuel to the air intake system; and
   (E) a controller which controls the liquid fuel supply and the gaseous fuel supply to:
      i. selectively operate the engine in a first, diesel-only mode in which the engine is fueled at least primarily by the liquid fuel supplied in a commanded quantity; then
      ii. selectively operating the engine in a second, pilot mode in which the engine is fueled at least partially by the gaseous fuel supplied in a commanded quantity; and
      iii. during a transition period from between said first and second modes,
         1. increasing the gaseous fuel supply quantity from zero to the commanded quantity, then
         2. decreasing a liquid fuel supply quantity from the commanded quantity to a pilot quantity.

17. The engine of claim 16, wherein the controller controls the liquid fuel supply to decrease the supply of liquid fuel after a predetermined delay period that follows the end of the gaseous fuel increasing operation.

18. The engine of claim 16, wherein the predetermined delay period varies directly with the at least one of speed and load, and engine geometry.

19. The engine of claim 18, wherein the predetermined delay period is one which avoids a lean limit of gas lambda from being exceeded during the transition period.

20. The engine of claim 16, wherein the controller controls the gaseous fuel supply to decrease the gas quantity from zero to the commanded quantity in a single step.

21. The engine of claim 20, wherein the controller controls the liquid fuel supply to decrease the liquid fuel quantity from the commanded quantity to the pilot quantity in a plurality of increments of predetermined magnitude.

* * * * *